United States Patent
Liu et al.

(10) Patent No.: US 9,045,673 B2
(45) Date of Patent: Jun. 2, 2015

(54) BINDING AGENT, SURFACE TREATMENT METHODS USING THE BINDING AGENT AND ARTICLE MANUFACTURED BY THE SAME

(75) Inventors: Xu Liu, Shenzhen (CN); Da-Hua Cao, Shenzhen (CN)

(73) Assignees: SHENZHEN FUTAIHONG PRECISION INDUSTRY CO., LTD., Shenzhen (CN); FIH (Hong Kong) Limited, Kowloon (HK)

( * ) Notice: Subject to any disclaimer, the term of this patent is extended or adjusted under 35 U.S.C. 154(b) by 308 days.

(21) Appl. No.: 13/534,339

(22) Filed: Jun. 27, 2012

(65) Prior Publication Data

US 2013/0248052 A1    Sep. 26, 2013

(30) Foreign Application Priority Data

Mar. 23, 2012 (CN) .......................... 2012 1 0079147

(51) Int. Cl.
*B32B 15/08* (2006.01)
*B32B 27/26* (2006.01)
*C09J 183/06* (2006.01)
*C09D 4/00* (2006.01)
*C23C 22/48* (2006.01)

(52) U.S. Cl.
CPC ............... *C09J 183/06* (2013.01); *B32B 15/08* (2013.01); *B32B 27/26* (2013.01); *C23C 22/48* (2013.01); *C09D 4/00* (2013.01)

(58) Field of Classification Search
CPC .... C23C 2222/20; B32B 15/00; B32B 15/04; B32B 15/08; B32B 27/06; B32B 27/28; B32B 27/36
USPC .......................................... 428/432
See application file for complete search history.

(56) References Cited

U.S. PATENT DOCUMENTS

2003/0152708 A1* 8/2003 Kron et al. ................. 427/385.5

* cited by examiner

*Primary Examiner* — Lois Zheng
(74) *Attorney, Agent, or Firm* — Novak Druce Connolly Bove + Quigg LLP

(57) ABSTRACT

A binding agent includes 3-glycidyloxypropyltrimethoxysilane, ethanol, isopropyl alcohol, alkylphenol ethoxylate, acetic acid and sodium dodecylbenzenesulfonate. The surface treatment method using the binding agent and articles manufactured by the method is also provided.

4 Claims, 1 Drawing Sheet

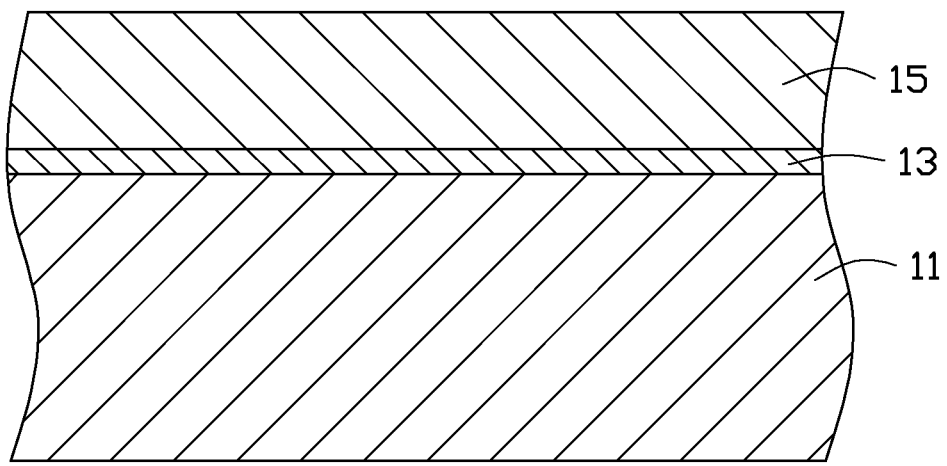

BINDING AGENT, SURFACE TREATMENT METHODS USING THE BINDING AGENT AND ARTICLE MANUFACTURED BY THE SAME

BACKGROUND

1. Technical Field

The exemplary disclosure generally relates to a binding agent, a surface treatment method using the binding agent and articles manufactured by the method.

2. Description of Related Art

Anodizing processes are usually applied to aluminum or aluminum alloy substrates to form decorative anodic oxide films thereon. However, for a welded aluminum or aluminum alloy substrate on which welding joint is formed, the anodic oxide film formed on the welding joint always presents an undesired black appearance. Paint having an appearance similar to the anodic oxide film may be sprayed on the welding joint to eliminate the black appearance. However, paint poorly bonds to the substrate.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout the several views.

The figure illustrates a cross-sectional view of an exemplary embodiment of an article.

DETAILED DESCRIPTION

An exemplary binding agent mainly includes 3-glycidyloxypropyltrimethoxysilane (also named as silane coupling agent KH560), ethanol, isopropyl alcohol, alkylphenol ethoxylate (OP-10), acetic acid and sodium dodecylbenzenesulfonate, wherein the mass percentage of the 3-glycidyloxypropyltrimethoxysilane is about 20% to about 40%, the mass percentage of the ethanol is about 10% to about 30%, the mass percentage of the isopropyl alcohol is about 5% to about 10%, the mass percentage of the alkylphenol ethoxylate is about 0.1% to about 0.4%, the mass percentage of the acetic acid is about 0.2% to about 0.5%, the mass percentage of the sodium dodecylbenzenesulfonate is about 0.1% to about 0.4%, and the remainder is water.

The sodium dodecylbenzenesulfonate acts as a surfactant which decreases the surface tension of the binding agent, and allows the binding agent to securely bond with a metal substrate. The sodium dodecylbenzenesulfonate can also enhance the dispersibility of the 3-glycidyloxypropyltrimethoxysilane in the binding agent.

The 3-glycidyloxypropyltrimethoxysilane has a low surface energy, which provides the 3-glycidyloxypropyltrimethoxysilane a property of reacting with ethanol and/or isopropyl alcohol to form Si—OMe (wherein Me is used as a symbol for $CH_3CH_2$, or $(CH_3)_2CH$). The Si—OMe can improve the compatibility of the binding agent and water.

Referring to the figure, a surface treatment method using the binding agent may include at least following steps:

A substrate 11 is provided. The substrate 11 is made of metal, such as stainless steel, aluminum alloy and magnesium alloy.

The substrate 11 is pretreated by washing it with a solution (e.g., alcohol or acetone) which can be done in an ultrasonic cleaner, to remove impurities, such as grease, or dirt. Then, the substrate 11 is dried.

The binding agent is provided. The binding agent mainly includes 3-glycidyloxypropyltrimethoxysilane, ethanol, isopropyl alcohol, OP-10, acetic acid, and sodium dodecylbenzenesulfonate.

The binding agent may be made by the following steps:

3-glycidyloxypropyltrimethoxysilane, ethanol, isopropyl alcohol, OP-10, acetic acid, sodium dodecylbenzenesulfonate and deionized water are provided as raw materials, wherein the mass percentage of the 3-glycidyloxypropyltrimethoxysilane is about 20% to about 40%, the mass percentage of the ethanol is about 10% to about 30%, the mass percentage of the isopropyl alcohol is about 5% to about 10%, the mass percentage of the alkylphenol ethoxylate is about 0.1% to about 0.4%, the mass percentage of the acetic acid is about 0.2% to about 0.5%, the mass percentage of the sodium dodecylbenzenesulfonate is about 0.1% to about 0.4%, and the remainder is substantially deionized water.

The ethanol, isopropyl alcohol, OP-10, acetic acid, sodium dodecylbenzenesulfonate, and deionized water are mixed and stirred to create a uniform mixture. Then 3-glycidyloxypropyltrimethoxysilane is added to the mixture, and the mixture is heated to about 50° C. to about 60° C., followed by a stirring process for about 0.5 h to about 2 h under the temperature.

The binding agent is sprayed on the surface of the substrate 11. Then, the substrate 11 is baked at an internal oven temperature of about 95° C. to about 150° C. for about 10 min to about 15 min. As such, a binding layer 13 is formed on the substrate 11. The thickness of the binding layer 13 is about 1 μm to about 4 μm.

A paint layer 15 is formed on the binding layer 13 by spraying. A spray gun is provided. The spraying pressure of the spray gun is about 3 MPa to about 5 MPa. During spraying, the distance between the substrate 11 and the spray gun is about 15 cm to about 25 cm. After spraying, the paint levels evenly on the binding layer 13 at an ambient temperature of about 23° C. to about 27° C. for about 3.5 min to about 4.5 min. Then, the paint layer 15 is baked at an internal oven temperature of about 80° C. to about 120° C. The thickness of the paint layer 15 is about 20 μm to about 50 μm. In the embodiment, the paint used to form the paint layer 15 has an appearance like the anodic oxide film.

The paint mainly includes acrylic resin, methyl acrylate, isopropyl alcohol, diaceton alcohol, butanol, 2-aminoethanol, and organic pigments, wherein the mass percentage of the acrylic resin is about 15% to about 20%, the mass percentage of the methyl acrylate is about 15% to about 20%, the mass percentage of the isopropyl alcohol is about 4% to about 6%, the mass percentage of the diaceton alcohol is about 3% to about 5%, the mass percentage of the butanol is about 12% to about 15%, the mass percentage of the 2-aminoethanol is about 7% to about 10%, and the mass percentage of the organic pigments is about 10% to about 15%.

An article manufactured by the method is also provided. The article 10 includes a substrate 11, a binding layer 13 formed on the substrate 11, and a paint layer 15 formed on the binding layer 13.

The substrate 11 may be made of metal, such as stainless steel, aluminum alloy and magnesium alloy.

The thickness of the binding layer 13 is about 1 μm to about 4 μm. The binding layer 13 mainly containing 3-glycidyloxypropyltrimethoxysilane, ethanol, isopropyl alcohol, OP-10, acetic acid, and sodium dodecylbenzenesulfonate.

The thickness of the paint layer 15 is about 20 μm to about 50 μm. In the embodiment, the paint used to form the paint layer 13 is provided by Cang Wu Coating Limited Company.

In the exemplary embodiment, the 3-glycidyloxypropyltrimethoxysilane contained in the binding agent is prone to hydrolysis and condensation to produce low polymer siloxane which contains Si—OH. When the binding agent adhesives to the surface of the substrate 11, the low polymer siloxane will react with metal ions (such as $Fe^{2+}$, $Fe^{3+}$, $Ni^{2+}$, $Cr^{2+}$, $Al^{3+}$ and $Mg^{2+}$) and form Si—O—M (M may be Fe, Ni, Cr, Al or Mg), which enhances the bond between the binding layer 13 and the substrate 11. Additionally, the binding agent can securely bond with the paint layer 15.

It is to be understood, however, that even through numerous characteristics and advantages of the exemplary disclosure have been set forth in the foregoing description, together with details of the system and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An article, comprising:
    a metal substrate;
    a binding layer formed on the substrate, the binding layer mainly containing 3-glycidyloxypropyltrimethoxysilane, ethanol, isopropyl alcohol, alkylphenol ethoxylate, acetic acid, and sodium dodecylbenzenesulfonate; and
    a paint layer formed on the binding layer.

2. The article as claimed in claim 1, wherein thickness of the binding layer is about 1 μm to about 4 μm.

3. The article as claimed in claim 1, wherein thickness of the paint layer is about 20 μm to about 50 μm.

4. The article as claimed in claim 1, wherein the substrate is made of stainless steel, aluminum alloy or magnesium alloy.

* * * * *